(12) United States Patent
Kido et al.

(10) Patent No.: US 7,688,551 B2
(45) Date of Patent: Mar. 30, 2010

(54) HEAD SUSPENSION ASSEMBLY AND STORAGE DEVICE

(75) Inventors: Takuma Kido, Kawasaki (JP); Toru Watanabe, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 583 days.

(21) Appl. No.: 11/605,703

(22) Filed: Nov. 29, 2006

(65) Prior Publication Data

US 2008/0013215 A1 Jan. 17, 2008

(30) Foreign Application Priority Data

Jul. 13, 2006 (JP) .............................. 2006-193121

(51) Int. Cl.
*G11B 21/16* (2006.01)

(52) U.S. Cl. ............... 360/244.9; 360/244.8; 360/245.2

(58) Field of Classification Search .............. 360/244.5, 360/244.9, 244.2, 244.3, 245.5, 245.2, 244.7, 360/244.8, 244, 240, 244.4, 245.3
See application file for complete search history.

(56) References Cited

U.S. PATENT DOCUMENTS 5,894,381 A * 4/1999 Allen et al. .............. 360/244.9
6,014,289 A * 1/2000 Goss ........................ 360/244.1
6,597,538 B1 7/2003 Kashima et al.
6,731,466 B2 * 5/2004 Arya ........................ 360/244.3
6,956,721 B1 * 10/2005 Khan ........................ 360/244.8
2001/0048574 A1 * 12/2001 Bhattacharya et al. ... 360/244.2
2005/0201014 A1 9/2005 Fujimoto et al.
2006/0250725 A1 11/2006 Tada et al.

FOREIGN PATENT DOCUMENTS

JP 2001-503548 3/2001
JP 2005-259228 9/2005

* cited by examiner

*Primary Examiner*—Craig A. Renner
*Assistant Examiner*—Tamara Ashford
(74) *Attorney, Agent, or Firm*—Greer, Burns & Crain, Ltd.

(57) ABSTRACT

A hinge plate is bonded to a base plate and a load beam in a head suspension assembly. The load beam includes a wide section and a narrow section extending forward from the front end of the wide section. The head suspension assembly allows the load beam to have a narrower width based on the narrow section. The load beam is thus allowed to enjoy a reduced weight. The mass is reduced at a position distanced from the centerline of the load beam. This results in a reduction in the inertial force around the centerline in the load beam. The inventors have demonstrated that the resonance frequency of the first torsion mode is allowed to fall in a higher frequency range. The resonance of the head suspension assembly can be reduced.

18 Claims, 9 Drawing Sheets

|  | 1st Bending [kHz] | 1st Torsion [kHz] | 2nd Torsion [kHz] | Sway [kHz] | Mass [mg] |
|---|---|---|---|---|---|
| 1st Comparative Example | 6.1 | 7.9 | 18.8 | 23.6 | 35.99 |
| 2nd Comparative Example | 6.8 | 8.2 | 17.0 | 13.8 | 34.04 |
| Increase (Decrease) [%] | +10.2 | +3.6 | -9.6 | -41.5 | -5.4 |

FIG.10

|  | 1st Bending [kHz] | 1st Torsion [kHz] | 2nd Torsion [kHz] | Sway [kHz] | Mass [mg] |
|---|---|---|---|---|---|
| 1st Comparative Example | 6.1 | 7.9 | 18.8 | 23.6 | 35.99 |
| 1st Embodied Example | 6.2 | 10.3 | 18.6 | 20.1 | 35.30 |
| Increase (Decrease) [%] | +1.6 | +30.3 | -1.1 | -14.8 | -1.9 |

FIG.11

|  | 1st Bending [kHz] | 1st Torsion [kHz] | 2nd Torsion [kHz] | Sway [kHz] | Mass [mg] |
|---|---|---|---|---|---|
| 1st Comparative Example | 6.1 | 7.9 | 18.8 | 23.6 | 35.99 |
| 2nd Embodied Example | 5.8 | 12.2 | 18.8 | 20.2 | 35.34 |
| Increase (Decrease) [%] | -4.9 | +54.4 | 0.0 | -14.4 | -1.8 |

FIG.12

|  | 1st Bending [kHz] | 1st Torsion [kHz] | 2nd Torsion [kHz] | Sway [kHz] | Mass [mg] |
|---|---|---|---|---|---|
| 1st Comparative Example | 6.1 | 7.9 | 18.8 | 23.6 | 35.99 |
| 3rd Embodied Example | 5.3 | 10.4 | 17.8 | 23.1 | 36.88 |
| Increase (Decrease) [%] | -13.1 | +31.6 | -5.3 | -2.1 | +2.5 |

|  | 1st Bending [kHz] | 1st Torsion [kHz] | 2nd Torsion [kHz] | Sway [kHz] | Mass [mg] |
|---|---|---|---|---|---|
| 1st Comparative Example | 6.1 | 7.9 | 18.8 | 23.6 | 35.99 |
| 4th Embodied Example | 7.3 | 14.8 | 19.8 | 22.1 | 32.69 |
| Increase (Decrease) [%] | +19.7 | +87.3 | +5.3 | -6.4 | -9.2 |

HEAD SUSPENSION ASSEMBLY AND STORAGE DEVICE

BACKGROUND OF THE INVENTION

1. Field of the Invention

The present invention relates to a head suspension assembly incorporated in a storage device such as hard disk drive, HDD.

2. Description of the Prior Art

A head suspension assembly includes a base plate and a load beam distance d forward from the base plate at a predetermined interval. A leaf spring is utilized to couple the base plate and the load beam. A substrate is attached to the load beam. A head slider is supported on the front or tip end of the substrate. The leaf spring serves to urge the head slider toward a magnetic recoding disk.

The head slider is designed to read out position information from the magnetic recording disk in the hard disk drive. The position information is utilized to position the head slider. A so-called feedback control is effected. The resonance of the head suspension assembly results in an inaccurate positioning of the head slider. In particular, the resonance of a first torsion mode over a relatively low frequency band causes the head slider to sway in parallel with the surface of the magnetic recording disk.

SUMMARY OF THE INVENTION

It is accordingly an object of the present invention to provide a head suspension assembly capable of reduction in resonance.

According to the present invention, there is provided a head suspension assembly comprising: a base plate; a load beam distanced forward from the base plate at a predetermined interval; and a hinge plate bonded to the base plate and the load beam, the hinge plate exhibiting a predetermined elastic force. The load beam includes a wide section and a narrow section extending forward from a front end of the wide section, the wide section having a first width and bonded to the hinge plate, the narrow section having a second width smaller than the first width and bonded to the hinge plate.

The head suspension assembly allows the load beam to have a narrower width based on the narrow section. The load beam is thus allowed to enjoy a reduced weight. The mass is reduced at a position distanced from the centerline of the load beam. This results in a reduction in the inertial force around the centerline in the load beam. The inventors have demonstrated that the resonance frequency of the first torsion mode is allowed to fall in a higher frequency range. The resonance of the head suspension assembly can be reduced.

The load beam is bonded to the hinge plate at the wide section and the narrow section. The hinge plate is designed to extend farther than ever. The hinge plate thus serves to enhance the rigidity of the narrow section. The load beam is prevented from a reduction in the rigidity. The inventors have demonstrated that the resonance frequency of the sway mode is reliably prevented from a shift to a lower frequency range.

The head suspension assembly may further comprise a rib standing upright from the side edge of the narrow section. In addition, a rib may stand upright from the side edge of the hinge plate. Likewise, the head suspension assembly may further comprise a rib standing upright from the rear edge of the wide section. The hinge plate is bonded to the narrow section as described above. These ribs contribute to enhancement of the rigidity of the load beam. The load beam is surely prevented from a reduction in the rigidity.

The front end of the hinge plate may be located between the rear end of the narrow section and a protrusion defined at the front end of the narrow section to receive the head slider. The front end of the hinge plate can be located at an intermediate position between the protrusion and the rear end of the narrow section, for example. It has been observed that deformation of the load beam is maximized at the center of the load beam in the first torsion mode. The front end of the hinge plate is located at a position closer to the center. The hinge plate thus serves to further reinforce an enhancement of the rigidity of the load beam. The load beam is prevented from deformation at the center to the utmost. The resonance frequency of the sway mode is reliably prevented from a shift to a lower frequency range.

The load beam may include a reinforcing section between the front end of the wide section and the rear end of the narrow section, the reinforcing section getting smaller in width at a location closer to the narrow section. The reinforcing section contributes to suppression of a reduction in the rigidity of the load beam. The head suspension assembly may further comprise a substrate extending from its tip end supporting the head slider toward the rear end of the wide section, the substrate bonded to the load beam, at least part of the substrate having a width larger than the width of the narrow section. Since the width of the substrate is set larger than the width of the narrow section, the substrate overlying the load beam contributes to suppression of a reduction in the rigidity of the load beam. The resonance frequency of the sway mode is to the utmost prevented from a shift to a lower frequency range. It should be noted that the wide section and the narrow section in combination may form a T-shape.

The load beam may be made of a metallic material lighter than stainless steel. At least one of the load beam and the hinge plate may be made of a laminate material including a pair of metallic thin plates. In this case, the front end of the laminate material may include solely one of the metallic thin plates. The front ends of the load beam and the hinge plate are thus allowed to enjoy a smaller weight. Moreover, the rear ends or supported ends of the load beam and the hinge plate maintain a sufficient rigidity. The head suspension assembly may be incorporated in a storage device such as a hard disk drive.

BRIEF DESCRIPTION OF THE DRAWINGS

The above and other objects, features and advantages of the present invention will become apparent from the following description of the preferred embodiments in conjunction with the accompanying drawings, wherein:

FIG. 10 is a table showing the result of a simulation analysis for the first and second comparative examples;

FIG. 11 is a table showing the result of the simulation analysis for the first embodied example;

FIG. 12 is a table showing the result of the simulation analysis for the second embodied example;

DESCRIPTION OF THE PREFERRED EMBODIMENTS

Figure 1:
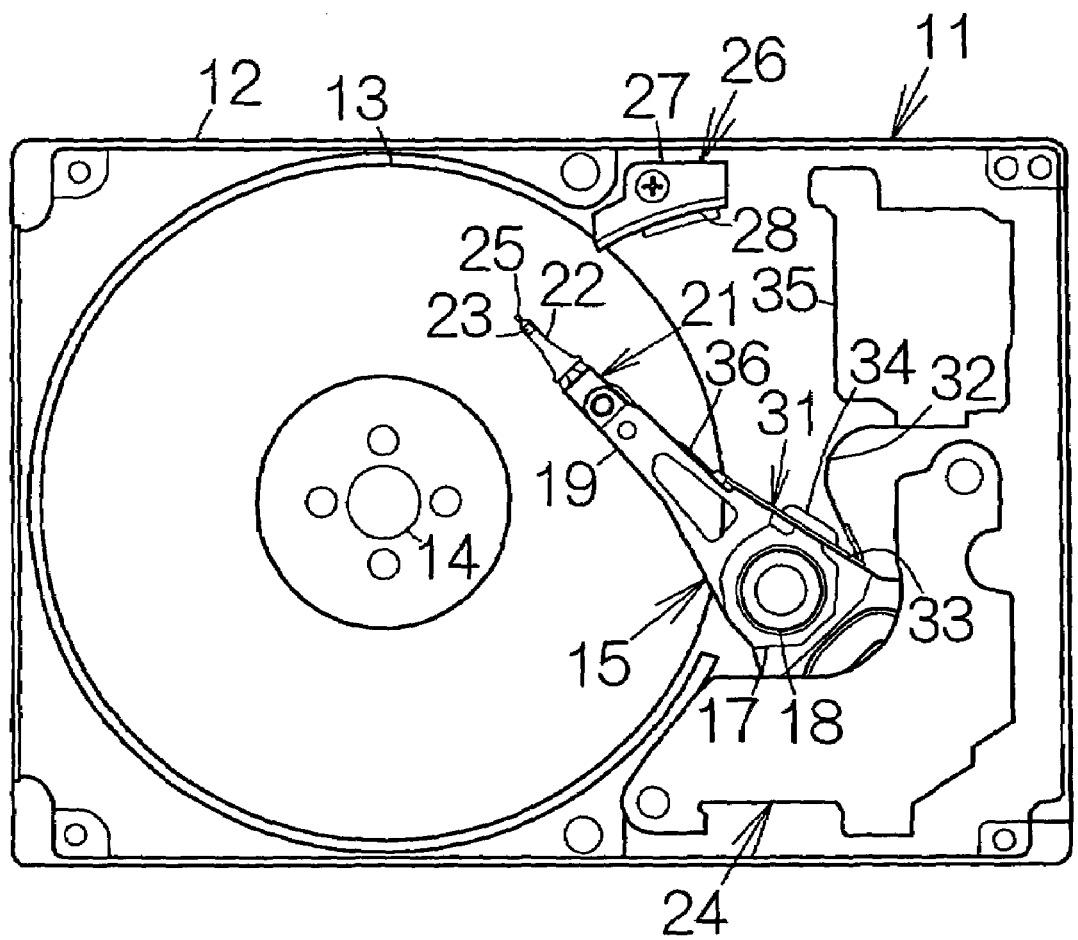
FIG. 1 is a plan view schematically illustrating the inner structure of a hard disk drive, HDD, as an example of a storage device according to the present invention.

FIG. 1 schematically illustrates the inner structure of a hard disk drive, HDD, 11 as an example of a storage medium drive or a storage device according to the present invention. The hard disk drive 11 includes a box-shaped enclosure body 12 defining an inner space in the form of a flat parallelepiped, for example. The enclosure body 12 may be made of a metallic material such as aluminum, for example. Molding process may be employed to form the enclosure body 12. An enclosure cover, not shown, is coupled to the enclosure body 12. An inner space is defined between the enclosure body 12 and the enclosure cover. Pressing process may be employed to form the enclosure cover out of a plate material, for example. The enclosure body 12 and the enclosure cover in combination establish an enclosure.

At least one magnetic recording disk 13 as a storage medium is incorporated in the enclosure body 12. The magnetic recording disk or disks 13 are mounted on the driving shaft of a spindle motor 14. The spindle motor 14 drives the magnetic recording disk or disks 13 at a higher revolution speed such as 5,400 rpm, 7,200 rpm, 10,000 rpm, 15,000 rpm, or the like.

A carriage 15 is also incorporated in the enclosure body 12. The carriage 15 includes a carriage block 17. The carriage block 17 is supported on a vertical support shaft 18 for relative rotation. Carriage arms 19 are defined in the carriage block 17. The carriage arms 19 are designed to extend in the horizontal direction from the vertical support shaft 18. The carriage block 17 may be made of aluminum, for example. Extrusion process may be employed to form the carriage block 17, for example.

A head suspension assembly 21 is attached to the front or tip end of the individual carriage arm 19. The head suspension assembly 21 is designed to extend forward from the carriage arm 19. The head suspension assembly 21 includes a head suspension 22 extending forward from the carriage arm 19. The head suspension 22 exhibits a force urging the front or tip end thereof toward the surface of the magnetic recording disk 13. A flying head slider 23 is fixed to the tip end of the head suspension 22.

An electromagnetic transducer, not shown, is mounted on the flying head slider 23. The electromagnetic transducer may include a write element and a read element. The write element may include a thin film magnetic head designed to write magnetic bit data into the magnetic recording disk 13 by utilizing a magnetic field induced at a thin film coil pattern. The read element may include a giant magnetoresistive (GMR) element or a tunnel-junction magnetoresistive (TMR) element designed to discriminate magnetic bit data on the magnetic recording disk 13 by utilizing variation in the electric resistance of a spin valve film or a tunnel-junction film, for example.

When the magnetic recording disk 13 rotates, the flying head slider 23 is allowed to receive an airflow generated along the rotating magnetic recording disk 13. The airflow serves to generate a positive pressure or a lift as well as a negative pressure on the flying head slider 23. The flying head slider 23 is thus allowed to keep flying above the surface of the magnetic recording disk 13 during the rotation of the magnetic recording disk 13 at a higher stability established by the balance between the urging force of the head suspension 22 and the combination of the lift and the negative pressure.

A power source or voice coil motor, VCM, 24 is coupled to the carriage block 17. The voice coil motor 24 serves to drive the carriage block 17 around the vertical support shaft 18. The rotation of the carriage block 17 allows the carriage arms 19 and the head suspension assemblies 21 to swing. When the carriage arm 19 swings around the vertical support shaft 18 during the flight of the flying head slider 23, the flying head slider 23 is allowed to move along the radial direction of the magnetic recording disk 13. The electromagnetic transducer on the flying head slider 23 can thus be positioned right above a target recording track on the magnetic recording disk 13.

A load member or tab 25 is attached to the front or tip end of the individual head suspension 22. The load tab 25 is designed to extend further forward from the tip end of the head suspension 22. The swinging movement of the carriage 15 allows the load tab 25 to move along the radial direction of the magnetic recording disk 13. A ramp member 26 is located on the movement path of the load tab 25 in a space outside the magnetic recording disk 13. The load tab 25 is received on the surface of the ramp member 26.

The ramp member 26 includes an attachment base 27 fixed to the bottom plate of the enclosure body 12 in a space outside the magnetic recording disk 13. The attachment base 27 may be screwed in the bottom plate of the enclosure body 12. The ramp member 26 also includes ramps 28 extending in the horizontal direction from the attachment base 27 toward the vertical support shaft 18 of the carriage 15. The tip end of the individual ramp 28 is opposed to a non-data zone outside the outermost recording track on the magnetic recording disk 13. The ramp member 26 and the load tabs 25 in combination establish a so-called load/unload mechanism. The ramp member 26 may be made of a hard plastic material, for example.

A flexible printed circuit board unit 31 is located on the carriage block 17. The flexible printed circuit board unit 31 includes a flexible printed wiring board 32. An adhesive may be utilized to attach the flexible printed wiring board 32 to the surface of a metal plate 33 such as a stainless steel plate, for example. A screw or screws may be utilized to fix the metal plate 33 to the carriage block 17, for example.

A head IC (integrated circuit) or preamplifier IC 34 is mounted on the flexible printed wiring board 32. The preamplifier IC 34 is designed to supply the read element with a sensing current when the magnetic bit data is to be read. The preamplifier IC 34 is also designed to supply the write element with a writing current when the magnetic bit data is to be written. A small-sized circuit board 35 is located within the inner space of the enclosure body 12. The small-sized circuit board 35 is designed to supply the preamplifier IC 34 with the sensing current and the writing current.

A flexible wiring board 36 is utilized to supply the sensing current and writing current. The flexible wiring board 36 is related to the individual head suspension 22. The flexible wiring board 36 has the structure of a so-called long-tail. The flexible wiring board 36 includes an insulating layer, a wiring pattern formed on the surface of the insulating layer, and a protection layer covering over the wiring pattern on the surface of the insulating layer, for example. The insulating layer and the protection layer are made of a polyimide resin, for example. The wiring pattern is made of copper, for example.

A positioning control signal is supplied to the voice coil motor 24 for positioning the electromagnetic transducer on the flying head slider 23 above a target recording track on the magnetic recording disk 13 in the hard disk drive 11. If the frequency of the positioning control signal coincides with the natural frequency of the head suspension 22, the head suspension 22 suffers from resonance. In general, one can observe the resonances of the first bending mode, the first torsion mode, the second torsion mode and the sway mode in the head suspension 22.

The resonance of the first bending mode causes the head suspension 22 to be bent into an arc shape between the flying head slider 23 and the carriage arm 19. This results in the movement of the flying head slider 23 in the vertical direction perpendicular to the surface of the magnetic recording disk 13, for example. The electromagnetic transducer on the flying head slider 23 thus hardly gets off the tracking recording track on the magnetic recording disk 13. Accordingly, the resonance of the first bending mode affects little the accuracy of the positioning of the flying head slider 23.

The resonance of the sway mode causes the displacement of the head suspension 22 in the horizontal direction parallel to the surface of the magnetic recording disk 13. Likewise, the resonances of the first and second torsion modes cause torsion in the head suspension 22. The head suspension 22 is displaced in the horizontal direction in parallel with the surface of the magnetic recording disk 13. This results in the displacement of the flying head slider 23 in the horizontal direction parallel to the surface of the magnetic recording disk 13. The electromagnetic transducer easily gets off the tracking recording track. In this case, the resonance frequencies of the sway mode and the second torsion mode fall in a relatively high frequency band as compared with that of the first torsion mode. Accordingly, the resonance of the first torsion mode affects a lot the accuracy of the positioning of the flying head slider 23.

Figure 2:
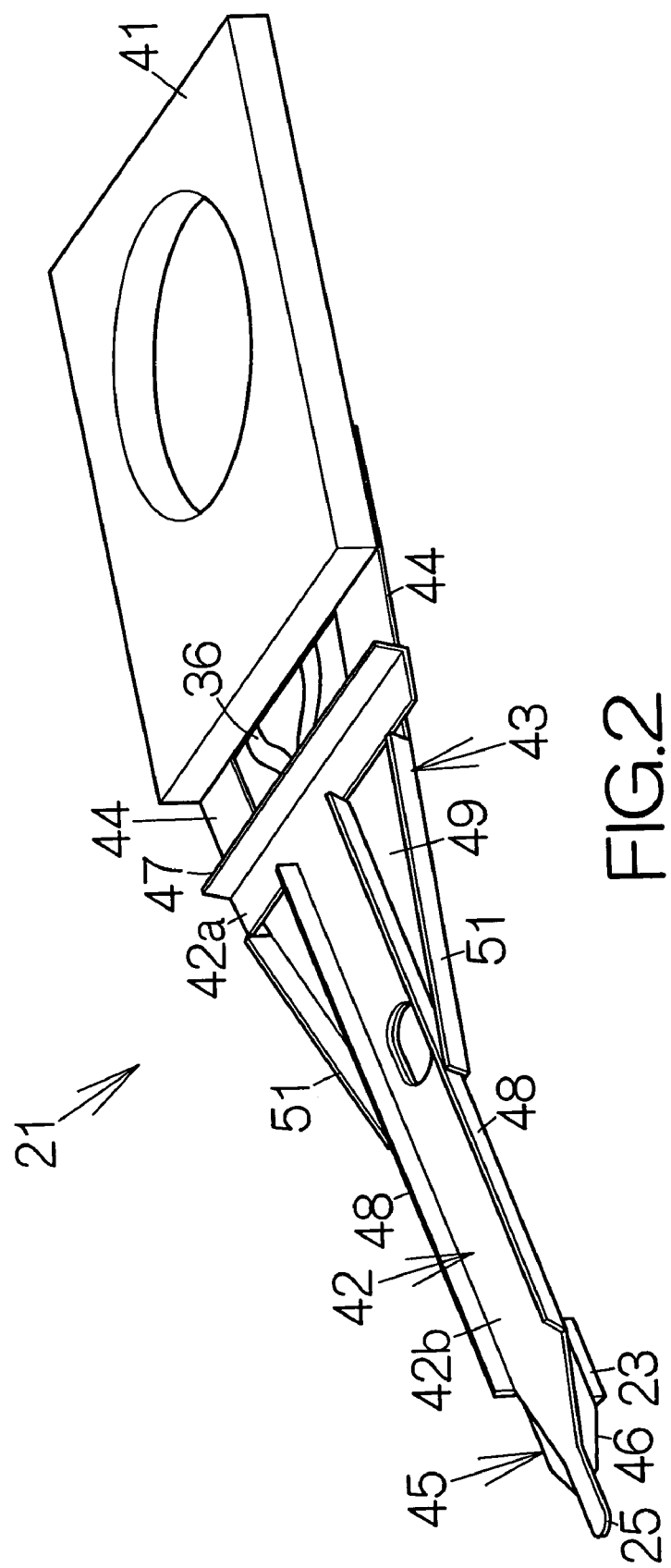
FIG. 2 is a perspective view schematically illustrating a head suspension assembly according to an embodiment of the present invention.

As shown in FIG. 2, the head suspension assembly 21 includes a base plate 41 attached to the tip end of the carriage arm 19, and a load beam 42 distanced forward from the base plate 41 at a predetermined interval. Caulking process is employed to attach the base plate 41 to the carriage arm 19, for example. The load beam 42 is made of a metallic material lighter than stainless steel. Such a metallic material includes aluminum and magnesium, for example. Alternatively, the load beam 42 may be made of stainless steel or a fiber-reinforced plastic (FRP). The thickness of the load beam 42 may be set in a range from 40 μm to 100 μm approximately, for example.

A hinge plate 43 is fixed to the front surfaces of the base plate 41 and the load beam 42. The hinge plate 43 includes an elastic bending section 44 between the front end of the base plate 41 and the rear end of the load beam 42. The hinge plate 43 serves to couple the base plate 41 with the load beam 42 in this manner. The hinge plate 43 is made of stainless steel, for example. The thickness of the hinge plate 43 may be set at 30 μm approximately, for example.

A flexure 45 is attached to the front surface of the load beam 42. The flexure 45 includes a substrate 46. A flying head slider 23 is attached on the front surface of the substrate 46. The substrate 46 may be made of stainless steel, for example. The thickness of the substrate 46 may be set at approximately 20 μm, for example. The aforementioned flexible wiring board 36 is formed on the front surface of the substrate 46. The flexible wiring board 36 is connected to the flying head slider 23. The flexible wiring board 36 is designed to extend backward from the front end of the load beam 42 toward the base plate 41. Here, the substrate 46 and the flexible wiring board 36 in combination serve as the flexure 45.

The load beam 42 includes a wide section 42a having a first width and a narrow section 42b having a second width smaller than the first width. The narrow section 42b is designed to extend forward from the front end of the wide section 42a. The wide section 42a is designed to extend in the lateral direction from the narrow section 42b. Accordingly, the wide section 42a and the narrow section 42b in combination form a T-shape. A rib 47 may be formed on the wide section 42a so as to stand upright at the rear edge of the wide section 42a. The rib 47 may extend in parallel with the front end of the base plate 41, for example. Ribs 48, 48 are also formed on the narrow section 42b so as to stand upright at the side edges of the narrow section 42b. The ribs 48, 48 are designed to extend in parallel with each other. The aforementioned load tab 25 is defined in the front end of the narrow section 42b.

The hinge plate 43 includes a main body 49. The main body 49 gets smaller in width, from the width of the boundary between the hinge plate 43 and the elastic bending section 44, at a position closer to the front end of the main body 49. The back surface of the main body 49 is designed to receive the wide section 42a and a part of narrow section 42b. The load beam 42 is in this manner fixed to the main body 49 at the wide section 42a and the narrow section 42b. The width of the main body 49 is set larger than the second width of the narrow section 42b. Ribs 51, 51 may be formed on the main body 49 so as to stand upright at the side edges of the main body 49. The ribs 51, 51 may be designed to extend along the aforementioned ribs 48, 48 at a position outside the ribs 48, 48.

Figure 3:
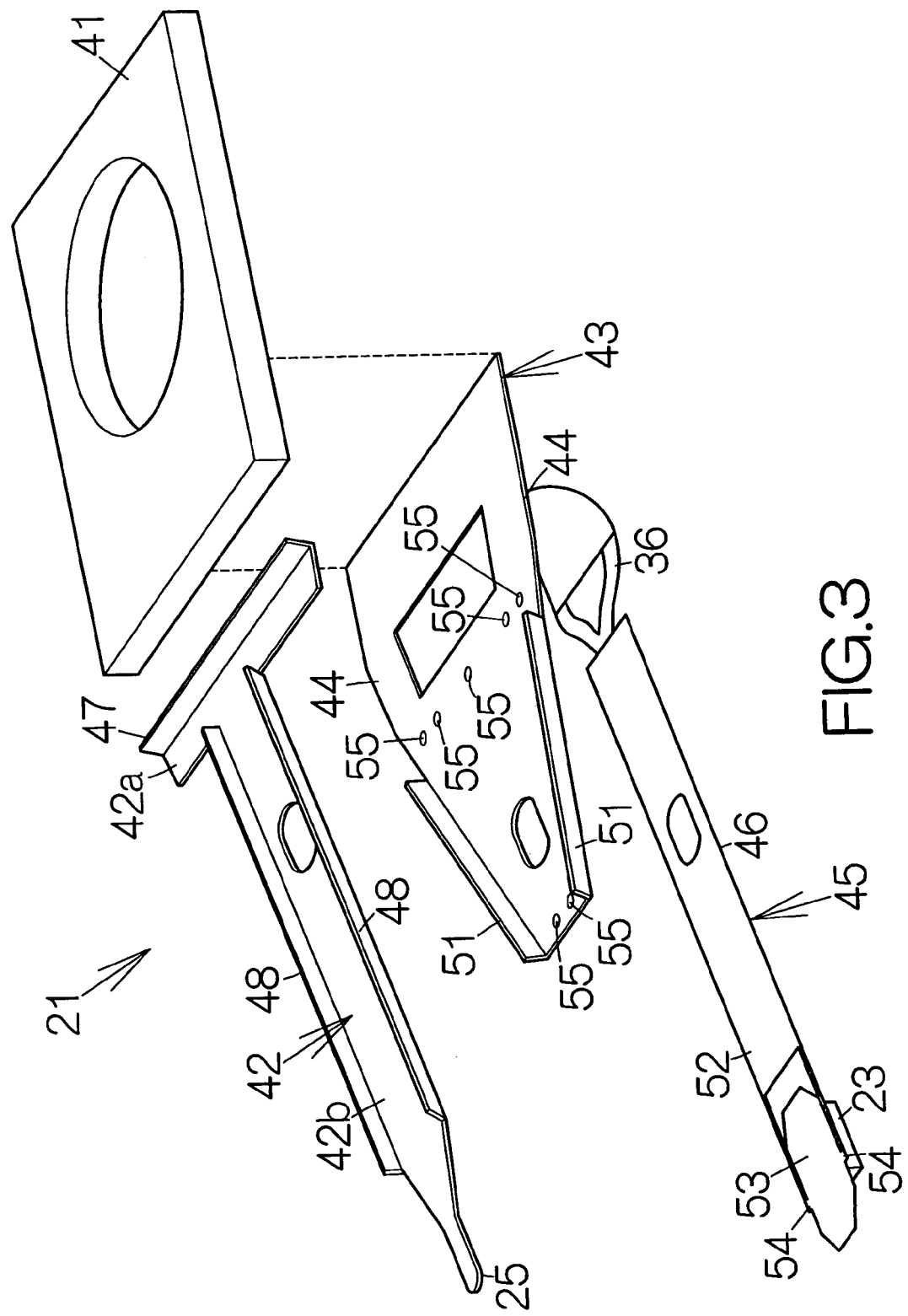
FIG. 3 is an exploded view schematically illustrating the head suspension assembly.

As shown in FIG. 3, the substrate 46 includes a fixation plate 52 and a support plate 53. The fixation plate 52 is fixed on the surfaces of the load beam 42 and the hinge plate 43. The support plate 53 receives the flying head slider 23 at the surface of the support plate 53. The flying head slider 23 may be bonded to the surface of the support plate 53. A so-called gimbal spring 54 is utilized to couple the support plate 53 to the fixation plate 52. The fixation plate 52, the support plate 53 and the gimbal spring 54 may be made of a sheet of a leaf spring material Here, the width of the substrate 46 may be set smaller than the second width of the narrow section 42b.

The load beam 42, the hinge plate 43 and the substrate 46 may be bonded together at joint spots 55. Spot welding utilizing a YAG laser may be employed for the bonding. The wide section 42a is in this manner bonded to the main body 49 at five joint spots 55, for example. The narrow section 42b is bonded to the main body 49 at two joint spots 55, for example, arranged along the front end of the main body 49.

Alternatively, a viscoelastic member may be utilized for the bonding. The viscoelastic member may be interposed between the load beam 42 and the hinge plate 43 as well as between the hinge plate 43 and the substrate 46, respectively. A double-sided adhesive tape may be employed as the viscoelastic member, for example. The double-sided adhesive tape may include a base material and adhesive layers overlaid on the front and back surfaces of the base material, for example. A viscoelastic material such as VEM may be employed as the base material, for example. The employment of a viscoelastic material contributes to attenuation of the resonance of the head suspension 22.

Figure 4:
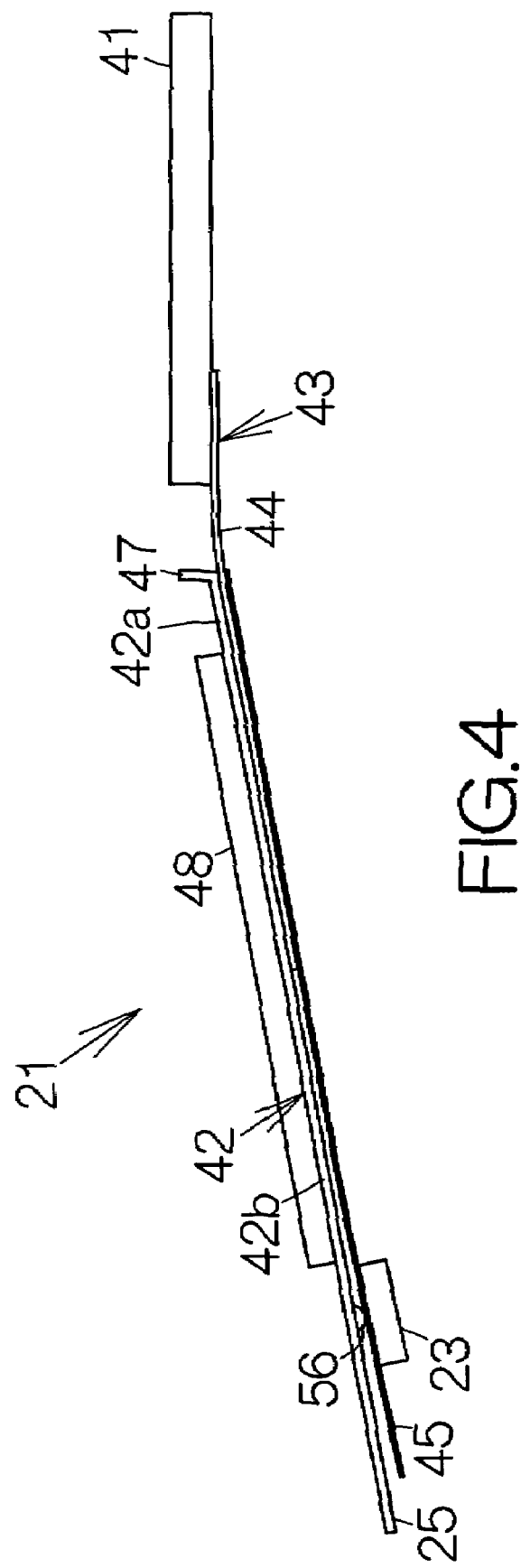
FIG. 4 is a side view schematically illustrating the head suspension assembly.

As shown in FIG. 4, the elastic bending section 44 of the hinge plate 43 bends between the front end of the base plate 41 and the rear end of the load beam 42. An imaginary plane including the surface of the base plate 41 intersects with an imaginary plane including the surface of the load beam 42 at a predetermined inclination angle. The load beam 42 gets closer to the surface of the magnetic recording disk 13 at a position remoter from the base plate 41. The flying head slider 23 or the back surface of the support plate 53 is received on a domed protrusion 56 formed on the front surface of the narrow section 42b. Here, the front end of the hinge plate 43 may be located at an intermediate position between the protrusion 56 and the elastic bending section 44.

The head suspension assembly 21 exhibits a predetermined elastic force or flexural force based on the bend of the elastic bending section 44. The flexural force serves to urge the front end of the load beam 42 toward the surface of the magnetic recording disk 13. In this case, the urging force is transmitted to the head slider 23 from the back of the support plate 53 through the protrusion 56. The flying head slider 23 is allowed to change its attitude with the assistance of the lift generated based on the airflow. The protrusion 56 enables the change in the attitude of the flying head slider 23 or the support plate 53.

The narrow section 42a serves to realize a smaller width of the load beam 42 in the head suspension assembly 21. This results in a reduction in the weight of the load beam 42 or the head suspension assembly 21. The load beam 42 is allowed to enjoy a smaller mass at a position remoter from the longitudinal centerline of the load beam 42 as described later in detail. This results in a reduction in the inertial force around the longitudinal centerline in the load beam 42. The resonance frequency of the first torsion mode falls in a higher frequency range. The resonance of the head suspension assembly 21 can be reduced. This results in the write/read operation of the electromagnetic transducer on the flying head slider 23 with a higher accuracy.

The load beam 42 is bonded to the hinge plate 43 at the wide section 42a and the narrow section 42b. The hinge plate 43 has a larger longitudinal dimension. The width of the hinge plate 43 is set larger than the second width of the narrow section 42b. The ribs 51 can be formed on the hinge plate 43. The ribs 51 are designed to extend along the corresponding ribs 48 of the load beam 42. The ribs are thus doubly defined. The rib 47 is additionally defined at the rear edge of the wide section 42a. The hinge plate 43 greatly reinforces the rigidity of the narrow section 42b of the load beam 42. It is thus possible to suppress a reduction in the rigidity of the load beam 42. The resonance frequency of the sway mode is reliably prevented from a shift to a lower frequency range, as described later in detail.

The front end of the hinge plate 43 is located at an intermediate position between the protrusion 56 and the elastic bending section 44. The front end of the hinge plate 43 is located around an intermediate position of the load beam 42 in the longitudinal direction. It has been observed that deformation of the load beam 42 is maximized at the center of the load beam 42 in the first torsion mode. Since the front end of the hinge plate 43 is located at this center, the hinge plate 43 thus serves to reinforce the rigidity of the load beam 42. The load beam 42 is reliably prevented from deformation at the center. The resonance frequency of the sway mode is reliably prevented from a shift to a lower frequency range.

Figure 5:
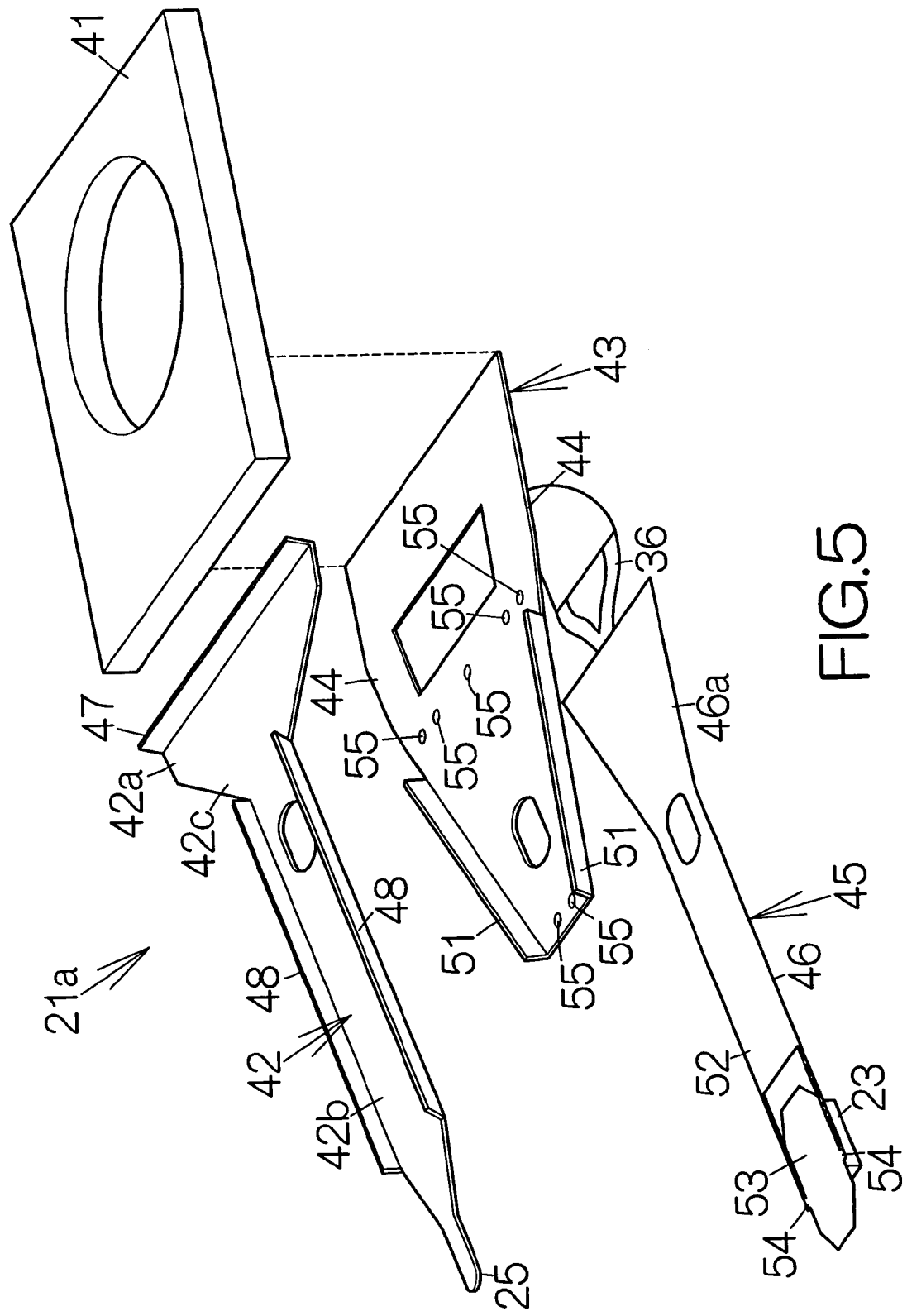
FIG. 5 is an exploded view schematically illustrating a head suspension assembly according to another embodiment of the present invention.

As shown in FIG. 5, a head suspension assembly 21a may be attached to the tip end of the carriage arm 19 in place of the aforementioned head suspension assembly 21. The load beam 42 includes a reinforcing section 42c between the front end of the wide section 42a and the rear end of the narrow section 42b. The reinforcing section 42c is formed integral with the wide section 42a and the narrow section 42b. Therein forcing section 42c gets smaller in width, from the width of the wide section 42a, toward the narrow section 42b. No rib is defined in the side edges of the reinforcing section 42c.

The substrate 46 includes a wide section 46a at its rear end. The wide section 46a defines the maximum width at its rear end. The wide section 46a gets smaller in width at a location closer to the front end. The wide section 46a is designed to extend toward the rear end of the wide section 42a of the load beam 42. The substrate 46 is bonded to the hinge plate 43 at the wide section 46a. The width of the wide section 46a may be set larger than the second width of the narrow section 42b of the load beam 42. Like reference numerals are attached to the structure or components equivalent to those of the aforementioned head suspension assembly 21.

The reinforcing section 42c is defined at a position between the front end of the wide section 42a and the rear end of the narrow section 42b in the head suspension assembly 21a. No rib is defined in the reinforcing section 42c. This results in a reduction in the inertial force around the longitudinal centerline in the load beam 42. Furthermore, the wide section 46a of the substrate 46 has a width set larger than the second width of the narrow section 42b. The wide section 46a is overlaid on the hinge plate 43 on the reinforcing section 42c. The reinforcing section 42c is prevented from a reduction in the rigidity irrespective of omission of ribs. The resonance frequency of the sway mode is reliably prevented from a shift to a lower frequency range.

Figure 6:
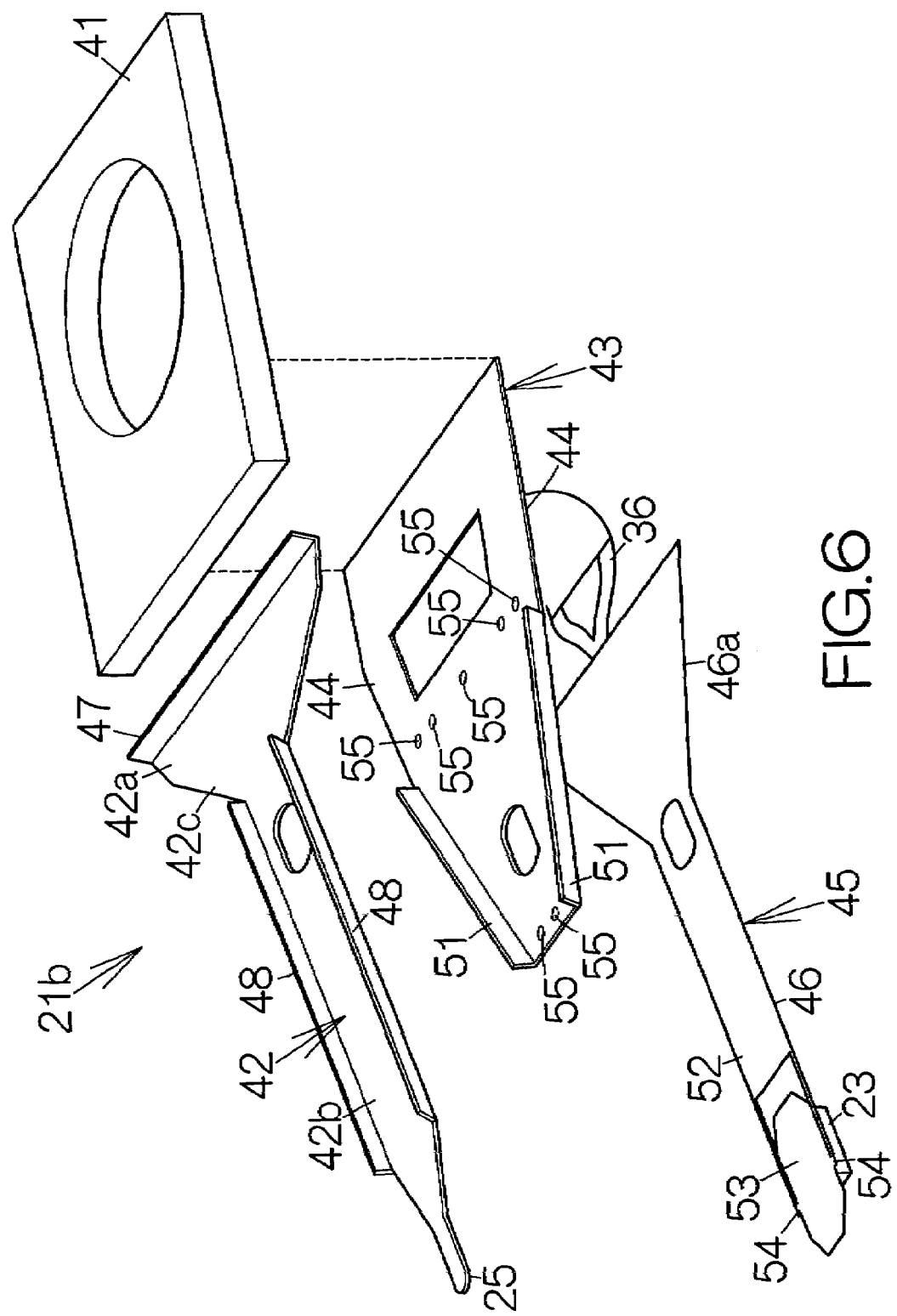
FIG. 6 is an exploded view schematically illustrating a head suspension assembly according to still another embodiment of the present invention.

As shown in FIG. 6, a head suspension assembly 21b may be attached to the tip end of the carriage arm 19 in place of the aforementioned head suspension assemblies 21, 21a. The first width of the wide section 42a is set larger in the head suspension assembly 21b as compared with the aforementioned head suspension assembly 21a. The first width is set equal to or larger than the width of the base plate 41, for example. The width of the wide section 46a of the substrate 46 is set larger as compared with the aforementioned one. The width of the hinge plate 43 is also set larger. Like reference numerals are attached to the structure or components equivalent to those of the aforementioned embodiments.

The head suspension assembly 21b contributes to a reduction in the inertial force around the longitudinal centerline in the load beam 42 in the same manner as the aforementioned embodiments. The load beam 42 is prevented from a reduction in the rigidity with a higher efficiency based on the increase in the width of the reinforcing section 42c, the first width of the wide section 42a, and the width of the wide section 46a. The resonance frequency of the sway mode is reliably prevented from a shift to a lower frequency range.

Figure 7:
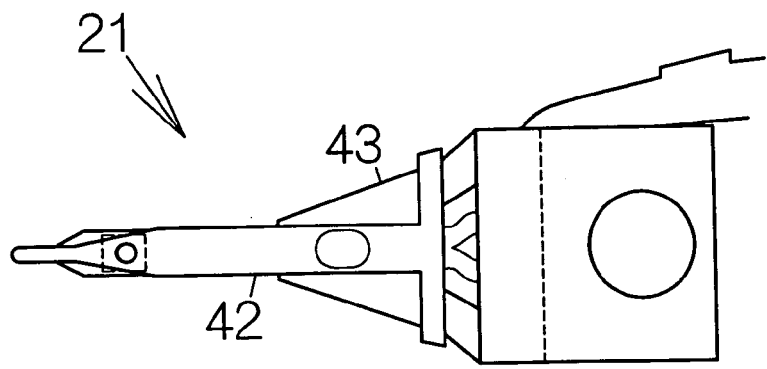
FIG. 7 is a plan view schematically illustrating a model of a head suspension assembly according to embodied examples.

The inventors have demonstrated the effects of the head suspension assemblies 21, 21a, 21b. The inventors conducted computer simulation analysis. The inventors considered first to fourth embodied examples and first and second comparative examples in the analysis. The first embodied example corresponds to a model of the aforementioned head suspension assembly 21, as shown in FIG. 7. The second embodied example corresponds to a model of the aforementioned head suspension assembly 21a. The third embodied example corresponds to a model of the aforementioned head suspension assembly 21b. The fourth embodied example corresponds to a model of the aforementioned head suspension assembly 21 except the load beam 42, made of aluminum, having thickness set 1.5 times larger than one in the other embodied examples.

Figure 8:
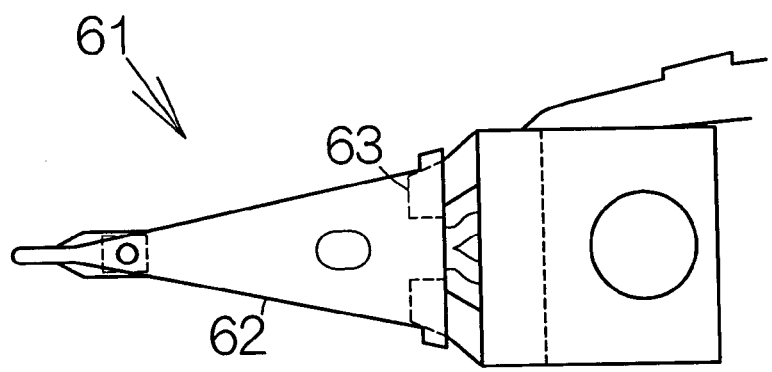
FIG. 8 is a plan view schematically illustrating a model of a head suspension assembly according to a first comparative example.
Figure 9:
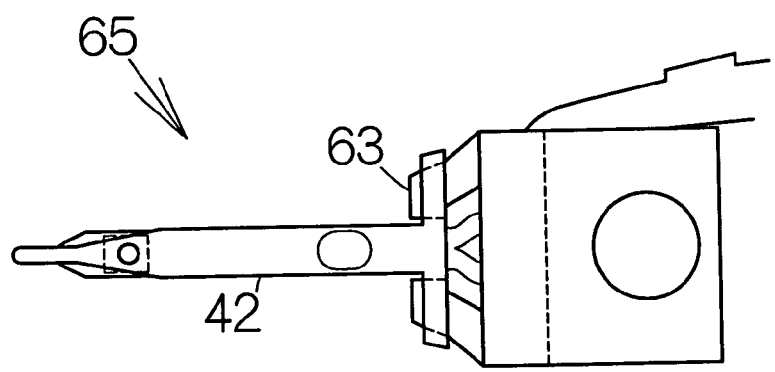
FIG. 9 is a plan view schematically illustrating a model of a head suspension assembly according to a second comparative example.

As is apparent from FIG. 8, the first comparative example corresponds to a model of a conventional head suspension assembly 61. A load beam 62 was tapered toward its front end. The rear end of the load beam 62 was bonded to the front end of a hinge plate 63. The conventional head suspension assembly 61 included a base plate and a flexure identical to those of the aforementioned head suspension assembly 21. The second comparative example corresponds to a model of a head suspension assembly 65, as shown in FIG. 9. The load beam 42 of the present invention was bonded to the aforementioned hinge plate 63.

The inventors calculated the resonance frequencies of the first bending mode, the first and second torsion modes and the sway mode for the models of the first to fourth embodied examples and the first and second comparative examples. The inventors also calculated the mass of the models. As shown in FIG. 10, it has been confirmed that the resonance frequency of the sway mode was shifted to a lower frequency range in the second comparative example as compared with the first comparative mode although the first comparative example enjoyed a significantly reduced mass as compared with the first comparative example. It has been confirmed that the narrow section 42b inevitably led to a reduced rigidity of the load beam 42.

As shown in FIG. 11, the mass of the first embodied example was reduced by 2% approximately as compared with the first comparative example. The resonance frequency of the first torsion mode was shifted to a significantly higher frequency range. It has been confirmed that the narrow section 42b serves to enable a reduction in the inertial force around the longitudinal centerline of the load beam 42. It has also been confirmed that the hinge plate 43 serves to prevent the load beam 42 from suffering from a reduction in the rigidity.

As shown in FIG. 12, the mass of the second embodied example was reduced by 2% approximately as compared with the first comparative example. The resonance frequency of the first torsion mode was shifted to a significantly higher frequency range. It has been confirmed that the narrow section 42b serves to enable a reduction in the inertial force around the longitudinal centerline of the load beam 42. It has also been confirmed that the hinge plate 43, the reinforcing section 42c and the wide section 46a serve to prevent the load beam 42 from a reduction in the rigidity.

Figures 13, 14, 15:
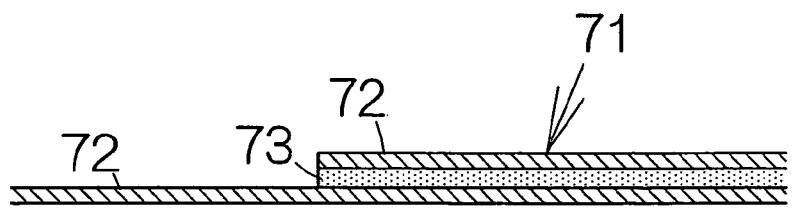
FIG. 13 is a table showing the result of the simulation analysis for the third embodied example.
FIG. 14 is a table showing the result of the simulation analysis for the fourth embodied example.
FIG. 15 is an enlarged partial sectional view schematically illustrating a laminate material.

As shown in FIG. 13, the mass of the third embodied example was increased by 2.5% approximately as compared with the first comparative example. The resonance frequency of the first torsion mode was shifted to a significantly higher range. It has been confirmed that the narrow section 42b serves to enable a reduction in the inertial force around the longitudinal centerline of the load beam 42. Furthermore, the resonance frequency of the sway mode was prevented from a shift to a lower frequency range. It has been demonstrated that the increase in the widths of the hinge plate 43 and the reinforcing section 42c and the formation of the wide section 46a contribute to enhancement of the rigidity of the load beam 42.

As shown in FIG. 14, the mass of the fourth embodied example was considerably reduced by more than 9% as compared with the first comparative example. The resonance frequency of the first torsion mode was shifted to a significantly higher frequency range. In addition, the resonance frequencies of the first bending mode and the second torsion mode were also shifted to a higher frequency range. It has been confirmed that the narrow section 42b and the employment of aluminum contribute to a reduction in the inertial force around the longitudinal centerline of the load beam 42. It has also been confirmed that the hinge plate 43 serves to prevent the load beam 42 from a reduction in the rigidity.

As shown in FIG. 15, a laminate material 71 may be utilized to form the load beam 42, the hinge plate 43 and the substrate 46. The laminate material 71 includes a pair of metallic thin plates 72, 72 and an adhesive layer 73 bonding the metallic thin plates 72, 72 to each other. A stainless steel plate may be employed as the metallic thin plates 72, for example. An adhesive made of a polyimide resin or the like may be employed as the adhesive layer 73. Alternatively, a viscoelastic layer made of a viscoelastic material such as VEM may be interposed between the metallic thin plates 72, 72. The viscoelastic layer contributes to attenuation in the resonance of the head suspension 22.

One of the metallic thin plates 72 may be omitted at the portions adjacent to the front ends of the load beam 42, the hinge plate 43 and the substrate 46, respectively. This results in a reduction in the weights of the tip ends of the load beam 42 and the hinge plate 43. A sufficient rigidity can also be maintained at the portions adjacent to the rear ends of the load beam 42 and the hinge plate 43.

The head suspension assembly 21 may include a damper member attached to the load beam 42, for example. The damper member may have a constraint vibration damping structure. The damper member may include a viscoelastic layer and a constraint layer, for example. The constraint layer may be made of a polyimide resin, stainless steel, or the like. The damper member serves to prevent the load beam 42 from a reduction in the rigidity.

The hinge plate 43 may be attached to a so-called unamount arm. The unamount arm is made of a stainless steel plate. The stainless steel plate defines the aforementioned carriage arm. A through hole is formed in the stainless steel plate. A support shaft is inserted into the through hole of the unamount arm. Two or more unamount arms are mounted on the support shaft 18 for relative rotation. A spacer is interposed between adjacent ones of the unamount arms around the support shaft 18. These unamount arms are incorporated in a hard disk drive of 1 inch or 1.8 inches type, for example.

What is claimed is:

1. A head suspension assembly comprising:
   a base plate;
   a load beam distanced forward from the base plate at a predetermined interval;
   a hinge plate bonded to the base plate and the load beam, the said hinge plate including an elastic bending section between the base plate and the load beam for exhibiting a predetermined elastic force, the hinge plate including a main body supporting the load beam in front of the elastic bending section; and
   ribs formed on the main body at side edaes of the main body, wherein the load beam includes a wide section and a narrow section extending forward from a front end of the wide section, the wide section having a first width and bonded to the main body of the hinge plate, the narrow section having a second width smaller than the first width and bonded to the main body of the hinge plate between the ribs.

2. The head suspension assembly according to claim 1, further comprising further ribs standing upright from side edges of the narrow section, respectively.

3. The head suspension assembly according to claim 1, further comprising a further rib standing upright from a rear edge of the wide section.

4. The head suspension assembly according to claim 1, wherein a front end of the hinge plate is located between a rear end of the narrow section and a protrusion defined at a front end of the narrow section to support a head slider.

5. The head suspension assembly according to claim 1, wherein the load beam includes a reinforcing section between the front end of the wide section and the rear end of the narrow section, the reinforcing section getting smaller in width at a location closer to the narrow section.

6. The head suspension assembly according to claim 5, further comprising a substrate extending from its tip end supporting the head slider toward the rear end of the wide section, the substrate bonded to the load beam, at least part of the substrate having a width larger than a width of the narrow section.

7. The head suspension assembly according to claim 1, wherein the load beam is made of a metallic material lighter than stainless steel.

8. The head suspension assembly according to claim 1, wherein at least one of the load beam and the hinge plate is made of a laminate material including a pair of metallic thin plates, and a front end of the laminate material including one of the metallic thin plates.

9. The head suspension assembly according to claim 1, wherein the wide section and the narrow section in combination form a T-shape.

10. A storage device comprising:
an enclosure; and
a head suspension assembly contained in the enclosure, wherein the head suspension assembly includes:
a base plate;
a load beam distanced forward from the base plate at a predetermined interval;
a hinge plate bonded to the base plate and the load beam, the hinge plate including an elastic bending section between the base plate and the load beam for exhibiting a predetermined elastic force, the hinge plate including a main body supporting the load beam in front of the elastic bending section; and
ribs formed on the main body at side edges of the main body, wherein the load beam includes a wide section and a narrow section extending forward from a front end of the wide section, the wide section having a first width and bonded to the main body of the hinge plate, the narrow section having a second width smaller than the first width and bonded to the main body of the hinge plate between the ribs.

11. The storage device according to claim 10, further comprising further ribs standing upright from side edges of the narrow section, respectively.

12. The storage device according to claim 10, further comprising a further rib standing upright from a rear edge of the wide section.

13. The storage device according to claim 10, wherein a front end of the hinge plate is located between a rear end of the narrow section and a protrusion defined at a front end of the narrow section to support a head slider.

14. The storage device according to claim 10, wherein the load beam includes a reinforcing section between the front end of the wide section and the rear end of the narrow section, the reinforcing section getting smaller in width at a location closer to the narrow section.

15. The storage device according to claim 14, further comprising a substrate extending from its tip end supporting the head slider toward the rear end of the wide section, the substrate bonded to the load beam, at least part of the substrate having a width larger than a width of the narrow section.

16. The storage device according to claim 10, wherein the load beam is made of a metallic material lighter than stainless steel.

17. The storage device according to claim 10, wherein at least one of the load beam and the hinge plate is made of a laminate material including a pair of metallic thin plates, and a front end of the laminate material including one of the metallic thin plates.

18. The storage device according to claim 10, wherein the wide section and the narrow section in combination form a T-shape.

* * * * *